United States Patent Office 3,252,901
Patented May 24, 1966

---

3,252,901
METHOD OF CONTROLLING ALGAE
Toby T. Zettler, Euclid, Ohio, assignor to Diamond Alkali Company, Cleveland, Ohio, a corporation of Delaware
No Drawing. Filed Oct. 7, 1963, Ser. No. 314,507
8 Claims. (Cl. 210—62)

This application is a continuation-in-part of copending application Serial No. 106,505, filed May 1, 1961, now U.S. Patent No. 3,187,004, and copending application Serial No. 204,054, now U.S. Patent No. 3,165,521, which in turn is a continuation-in-part of application Serial No. 635,615, filed January 23, 1957, now abandoned.

The present invention relates to a method for the control and prevention of microorganisms in aqueous media. Particularly, the present invention relates to a method for the control and prevention of algae in industrial water systems.

The increase in demand of expanding industry upon water for process and cooling purposes has forced conservation measures, particularly reuse of available water supplies. For instance, the conservation of available cooling water has been accomplished by the use of recirculating cooling towers. Besides being subject to severe scaling and corrosion problems, open recirculating cooling systems are an ideal environment for the stimulation of microbiological growths of many types, creating associated problems of corrosion, plugging of pipes and screens, interference with heat transfer, and attack of wood. The most frequent encountered microorganisms in open recirculating systems are algae. Despite the seasonal nature of the fouling problems caused by algae in cooling towers in most areas of the United States, the problem is perennial and one of increasing concern.

The problem of algae contamination in industrial water systems also arises quite frequently in connection with water towers in industrial establishments, with air conditioner plants, with water reservoirs and tanks, with ponds on farms and irrigation ditches, with settling ponds in wineries, with waste water sluices in paper mills, with sewage disposal units, with the tanks of toilets, and other similar locations conducive to algae formation of aqueous media.

The desirability of controlling and preventing the growth of algae in aqueous media is apparent from the great number of toxicants or preservatives in use. For instance, copper sulfate, chlorine, chloramines and hypochlorites have been used to control algal growths in recirculating cooling-tower water; however, in many systems the use of these chemicals is not desirable because of the deleterious sides effects that they might produce. In such uses the quantity of toxicant that is required, its cost, its effectiveness in any particular application and its persistence of ease of removal from the finished product as well as its continued effectiveness over long periods of use are other factors which also must be considered.

Therefore, the principal object of the present invention is to provide a method for the prevention of algae formation in aqueous media.

A further object is to provide a method for the killing of algae already formed in aqueous media.

A still further object is to provide a method for the control and prevention of algae in industrial water systems.

The above objects are accomplished by the method of the present invention which comprises the addition of polyhalogycolurils to aqueous media containing the algae.

The polyhaloglycolurils useful in the method of the present invention are represented by the following structure:

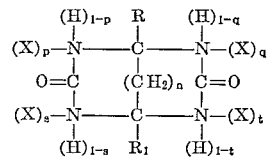

wherein X is a halogen selected from the group consisting of chlorine and bromine; R and $R_1$ are members selected from the group consisting of hydrogen, a lower alkyl radical from one to four carbon atoms and phenyl; and $n$, $p$, $q$, $s$, and $t$ are integers from zero to one. X may be the same or different halogen. R and $R_1$ may be the same or different radical.

Specific illustrative compounds for use in the present method are:

1,3,4,6-tetrachloroglycoluril

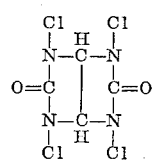

1,3,4,6-tetrachloro-3a,6a-dimethylglycoluril

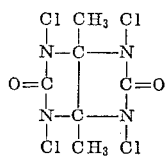

1,3,4,6-tetrachloro-3a-methylglycoluril

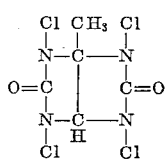

1,3,4,6-tetrachloro-3a,6a-diphenylglycoluril

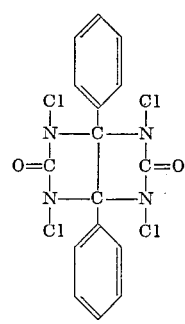

1,3,4,6-tetrachloro-3a-methyl-6a-phenylglycoluril

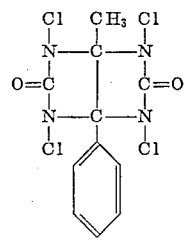

1,3,4,6-tetrachloro-3a-ethyl-6a-methylglycoluril

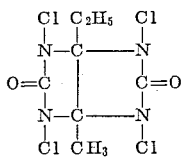

Dichloroglycoluril

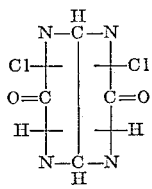

N,N-dibromo-N-monochloro-3α,6α-dimethylglycoluril

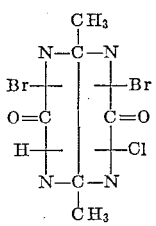

N-monobromo,N-monochloro-glycoluril

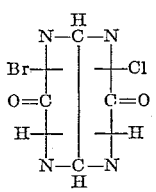

N,N-dibromoglycoluril

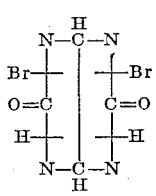

N-monobromo,N,N-dichloro-3α,6α-diphenylglycoluril

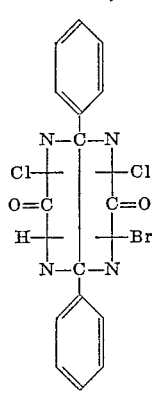

N,N-dibromo,N,N-dichloro-3α,6α-dimethylglycoluril

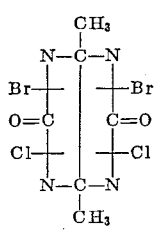

and 1,5 - dimethyl - 2,4,6,8 - tetrachloro-2,4,6,8-tetrabicyclo-(3.3.1)-nona-3,7,-dione

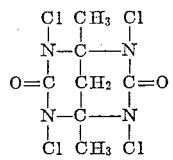

Although the specifically illustrated glycolurils disclose methyl, ethyl, and phenyl radical attached to the 3a and 6a carbon atoms, it is to be understood that considerable variation is possible and other combinations of aliphatic and aromatic groups may be substituted on the 3a and 6a carbon atoms, e.g., diethyl, diisopropyl, and the like. However, as the carbon chain length increases, the product generally is less soluble in water and often more difficult to prepare. Thus, the preferred polyhaloglycolurils for the method of the present invention are those where R and $R_1$ are either hydrogen or methyl. An especially preferred polyhaloglycoluril exhibiting algaestatic and algaecidal properties for use in the method of the present invention is where R and $R_1$ are hydrogen, X is chlorine, $p, q, s, t$, are 1 and $n$ is 0, e.g., 1,3,4,6-tetrachloroglycoluril.

Since the polyhaloglycolurils of this invention exhibit a rate of dissolution and hydrolysis which is somewhat slower than other halogenated organic compounds, they may be contacted with water and dissolved at a rate which provides a closely regulated, constant percentage of chlorine to the aqueous media over a long period of time without adding to or replenishing the treating chemical. Thus, the high-total halogen content of the polyhaloglycolurils and its slower dissolution and hydrolysis rates allow these compounds to be used in minimum quantities.

The algaecidal dosage requirements will very depending on the severity of the algal growths. The polyhaloglycolurils used in the present invention are effective when present in the aqueous media in concentrations up to about 1000 or more parts per million, but generally varying in concentration from about 0.1 to 100, preferably 0.5 to 5 parts per million, with the upper limit being based on economics rather than the effectiveness of the polyglycoluril. The polyhaloglycolurils useful in the present method may be applied to the algae by adding them to the water containing the algae.

Polyhaloglycolurils may generally be used in the form of a powder, a granule, a rod or stick, a tablet, or a briquette. When used as a powder the compound is confined in any suitable container and contacted with sufficient quantities of the circulating water to dissolve enough compound to supply the required level of residual chlorine to the aqueous media. When employed in the form of a compressed rod, or stick, a more even surface area is in contact with the aqueous media. This latter form is more convenient to handle, is easier to confine, and a possibility of such solids being flushed into the aqueous media is very remote. Additionally, the compound rods are very difficult to break and do not dust in shipment or in storage. Other forms in which polyhaloglycolurils may be fabricated are tablets or briquettes. After formation of the polyhaloglycoluril briquettes, they may be broken into chips to provide a larger surface area for contact with the aqueous medium. Binders, such as carboxymethylcellulose, polyvinylpyrrolidone, magnesium stearate, and the like may be used in the fabrication of the particular form of the polyhaloglycoluril compound.

The preparation of polyhaloglycoluril compounds useful in the method of the present invention is well known in the literature and reference is made to U.S. Patents Nos. 2,624,686; 2,654,763; 2,697,714; 2,803,564; 3,008,936; 3,017,591; 3,019,075 and 3,019,160 as being exemplary methods of preparing the polyhaloglycolurils useful in the present invention.

In order that those skilled in the art may more completely understand the present invention and the preferred methods by which the same may be carried into effect the following specific examples are offered.

EXAMPLE 1

Part A

*Prepartion of 1,3,4,6-tetrachloroglycoluril.*—Into two liters of water containing 50 grams of sodium bicarbonate is introduced and suspended 71 grams (0.5 mole) of glycoluril. The resulting mixture is chlorinated and continuously stirred and sodium bicarbonate solution (150 grams sodium bicarbonate in two liters of water) is added at a rate to maintain the pH of the solution between 4 and 8. Chlorination is continued until 130% of the stoichiometric amount of chlorine is introduced, i.e., a total of 182 grams. The resulting solid is separated, washed with about 1600 ml. of water, dried partially under suction for 10 to 15 minutes, and then allowed to air dry. The resulting product weighs 132 grams after drying. Chemical analyses indicate preparation of the desired product which contains 98.9% available chlorine as compared with the theoretical available chlorine of 101.4%.

Part B

The stock solution of a sample of 1,3,4,6-tetrachloroglycoluril, prepared in Part A, is serially diluted 1:1 through a series of 13 flasks of Allen's medium to yield a dosage range of 512 p.p.m. through 0.12 p.p.m. The flasks are inoculated with *Chlorella pyrenoidosa*, a unicellular green alga, and incubated according to a modification of the method of Palmer and Hahoney, Ohio J. Sci., 55, 1–8, 1955. At appropriate time intervals each flask is subcultured by transferring 1 ml. of the incubated medium into 50 ml. of fresh Allen's medium. All subcultures are incubated under a light intensity of 200 footcandles at 23–25° C. for 14 days. The test results are recorded in Table I below.

TABLE I.—RESULTS OF ALGAECIDAL TEST

| Concen. of 1,3,4,6-tetra-chloroglycoluril (p.p.m.) | Exposure Time | | | | | | | | | |
|---|---|---|---|---|---|---|---|---|---|---|
| | Hours | | | Days | | | | | | |
| | 2 | 4 | 8 | 1 | 2 | 4 | 7 | 14 | 21 | 28 |
| 512 | O | O | O | O | O | O | O | O | O | O |
| 256 | O | O | O | O | O | O | O | O | O | O |
| 128 | O | O | O | O | O | O | O | O | O | O |
| 64 | O | O | O | O | O | O | O | O | O | O |
| 32 | O | O | O | O | O | O | O | O | O | O |
| 16 | O | O | O | O | O | O | O | O | O | O |
| 8 | O | O | O | O | O | O | O | O | O | O |
| 4 | O | O | O | O | O | O | O | O | O | O |
| 2 | + | O | O | O | O | O | O | O | O | O |
| 1 | + | + | O | O | O | O | O | O | O | O |
| 0.5 | + | + | O | O | O | O | O | O | O | O |
| 0.25 | + | + | + | O | O | O | O | O | O | O |
| 0.12 | + | + | + | O | O | O | O | O | O | O |
| Control | + | + | + | + | + | + | + | + | + | + |

+—denotes survival; O—denotes kill.

The 1,3,4,6-tetrachloroglycoluril is algaecidal to *Chlorella pyrenoidosa* within two hours at 4 p.p.m.; within four hours at 2 p.p.m.; within eight hours at 1 p.p.m.; and within one day at 0.12 p.p.m.

EXAMPLE 2

To illustrate the algaestatic activity of 1,3,4,6-tetrachloroglycoluril against *Chlorella pyrenoidosa* prepared in Part A of Example 1, the method of Part B in Example 1 is employed. The test results obtained are recorded in Table II. Also recorded in Table II, for comparison purposes, are the results obtained using copper sulfate as the algaestatic component.

TABLE II.—RESULTS OF ALGAESTATIC TESTS

| Concen. of 1,3,4,6-tetrachloroglycoluril (p.p.m.) | Exposure Time in Days | | | | |
|---|---|---|---|---|---|
| | 4 | 7 | 14 | 21 | 28 |
| 512 | T | T | T | T | T |
| 256 | T | T | T | T | T |
| 128 | T | T | T | T | T |
| 64 | T | T | T | T | T |
| 32 | T | T | T | T | T |
| 16 | T | T | T | T | T |
| 8 | T | T | T | T | T |
| 4 | T | T | T | T | T |
| 2 | T | T | T | T | T |
| 1 | T | T | T | T | T |
| 0.5 | T | T | T | T | T |
| 0.25 | T | T | T | T | T |
| 0.12 | T | T | T | T | T |
| CuSO$_4$·5H$_2$O, 8 p.p.m. | T | T | T | T | P |
| CuSO$_4$·5H$_2$O, 4 p.p.m. | T | P | P | P | P |
| CuSO$_4$·5H$_2$O, 2 p.p.m. | P | P | P | P | P |
| Control | Normal growth | | | | |

T=Toxic; no growth.
P=Partial toxicity; less growth than control.

The 1,3,4,6-tetrachloroglycoluril sample is algaestatic for the *Chlorella pyrenoidosa* at a concentration of 0.12 p.p.m. It will be observed that the copper sulfate at a concentration at 8 p.p.m. was beginning to lose its toxicity after an exposure of 28 days; whereas at a concentration of 0.12, the 1,3,4,6-tetrachloroglycoluril showed no loss of toxicity over the same period of time.

It is to be understood that although the invention has been described with specific reference to particular embodiments thereof, it is not to be so limited since changes and alterations therein may be made which are within the full intended scope of this invention as defined by the appended claims.

It is claimed:

1. The method for treating an aqueous medium to inhibit the growth of algae in said aqueous medium, which comprises adding to said aqueous medium an algicidal amount of a compound having the structural formula:

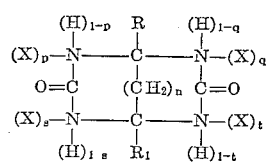

wherein X is a halogen selected from the group consisting of chlorine and bromine; R and R$_1$ are members selected from the group consisting of hydrogen, a lower alkyl radical from 1 to 4 carbon atoms and phenyl; and $n$, $p$, $q$, $s$ and $t$ are integers from 0 to 1.

2. The method of claim 1, wherein X is chlorine and $p$, $q$, $s$ and $t$ are 1.

3. The method of claim 1, wherein $n$ is 0.

4. The method of claim 1, wherein R and R$_1$ are hydrogen.

5. The method of claim 1, wherein the algicidal compound is present in the aqueous medium in a concentration of 0.1 to 100 parts per million.

6. The method of claim 1, wherein the aqueous medium is an industrial water system.

7. The method for treating an aqueous medium to inhibit the growth of algae in said aqueous medium, which comprises adding to said aqueous medium an algicidal amount of 1,3,4,6-tetrachloroglycoluril having the following formula:
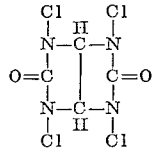
8. The method of claim 7, wherein the 1,3,4,6-tetrachloroglycoluril is present in the aqueous medium at a concentration of 0.1 to 100 parts per million.
References Cited by the Examiner
UNITED STATES PATENTS
3,019,160   1/1962   Slezak et al. _____ 167—33
MORRIS O. WOLK, *Primary Examiner.*